(12) United States Patent
Muir et al.

(10) Patent No.: US 11,868,025 B2
(45) Date of Patent: Jan. 9, 2024

(54) TEMPORAL RESOLUTION AND FIDELITY ENHANCEMENT OF ARBITRARY WAVEFORMS

(71) Applicant: Lawrence Livermore National Security, LLC, Livermora, CA (US)

(72) Inventors: Ryan D. Muir, Livermore, CA (US); Vincent J. Hernandez, Brisbane, CA (US); Brandon W. Buckley, Walnut Creek, CA (US); Daniel E. Mittelberger, Livermore, CA (US); John E. Heebner, San Ramon, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 325 days.

(21) Appl. No.: 17/075,953

(22) Filed: Oct. 21, 2020

(65) Prior Publication Data

US 2022/0121085 A1 Apr. 21, 2022

(51) Int. Cl.
*H03M 1/00* (2006.01)
*G02F 7/00* (2006.01)
*G02F 1/225* (2006.01)
*H04B 10/556* (2013.01)
*G02F 1/21* (2006.01)

(52) U.S. Cl.
CPC ............ *G02F 7/00* (2013.01); *G02F 1/2255* (2013.01); *G02F 1/2257* (2013.01); *H04B 10/556* (2013.01); *G02F 1/212* (2021.01)

(58) Field of Classification Search
CPC ........ G02F 7/00; G02F 1/2255; G02F 1/2257; G02F 1/212; G02F 2201/16; H04B 10/556; H04B 10/5051
USPC ........................................................ 341/137
See application file for complete search history.

(56) References Cited

U.S. PATENT DOCUMENTS

| | | | | |
|---|---|---|---|---|
| 4,789,240 A | * | 12/1988 | Bush | .................. G01D 5/35303 356/477 |
| 5,955,875 A | * | 9/1999 | Twichell | .............. G11C 13/047 324/96 |
| 9,753,354 B2 | * | 9/2017 | Schell | ........................ G02F 7/00 |
| 2010/0201345 A1 | * | 8/2010 | Gupta | ........................ G02F 7/00 341/137 |
| 2013/0058657 A1 | * | 3/2013 | Bucholtz | ............. H03M 1/1235 398/115 |

(Continued)

OTHER PUBLICATIONS

Keysight Techologies, Data Sheet—M9336A PXIe I/Q Arbitrary Waveform Generator Waveform Generator: 3-channel, up to 1 GHz I/Q bandwidth, Feb. 24, 2020, pp. 1-26, <https://literature.cdn.keysight.com/litweb/pdf/5992-2140EN.pdf?id=2837104>.

(Continued)

*Primary Examiner* — Jean B Jeanglaude
(74) *Attorney, Agent, or Firm* — Ladas & Parry, LLP

(57) ABSTRACT

Apparatuses comprising cascaded or series configurations of Mach-Zehnder electrooptic modulators, where the nonlinearities of the cascaded and series configurations of Mach-Zehnder electrooptic modulators increase signal bandwidth and boost signal fidelity in electronic digital to analog converters. The Mach-Zehnder electrooptic modulators are combined with photodiode detectors that are used to convert signals from the optical domain to the electrical domain.

11 Claims, 11 Drawing Sheets

(56) References Cited

U.S. PATENT DOCUMENTS

2019/0149191 A1* 5/2019 Shmel ............... H04B 1/71637
375/139

OTHER PUBLICATIONS

Zurich Instruments, UHFAWG—600 MHz Arbitrary Waveform Generator, <https://www.zhinst.com/products/uhfawg#>, printed Mar. 2, 2021 (3 pages).

Keysight Techologies, Data Sheet—M8190A Arbitrary Waveform Generator: 12 GSa/s Arbitrary Waveform Generator, Jan. 29, 2021, pp. 1-39, <https://literature.cdn.keysight.com/litweb/pdf/5990-7516EN.pdf?id=2024303>.

SHF Communication Technologies AG, Bit Error Test & Arbitrary Waveform Generation, <https://www.shf.de/products/arbitrary-waveform-generation/>, printed Mar. 2, 2021 (1 page).

Keysight Technologies, Search Results for M8195A, <https://www.keysight.com/en/pd-2443793-pn-M8195A/65-gsa-s-arbitrary-waveform-generator?nid=- 33319.1102215&cc=US&lc=eng>, printed Mar. 2, 2021 (2 pages).

Keysight Technologies, M8196A 92 GSa/s Arbitrary Waveform Generator, Data Sheet Version 2.1, Oct. 3, 2017, <https://literature.cdn_keysight.com/litweb/pdf/5992-0971EN.pdf?id=2631835> (12 pages).

* cited by examiner

TEMPORAL RESOLUTION AND FIDELITY ENHANCEMENT OF ARBITRARY WAVEFORMS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to digital to analog converter devices, and more specifically, it relates to technology for extending the bandwidth and dynamic range of such devices.

Description of Related Art

Digital to analog converter (DAC) devices are ubiquitous in all sectors of electronics and optics. Since these systems trend toward increasingly faster processes with large dynamic ranges, the need for higher fidelity and speed DAC devices is constantly increasing. Unfortunately, signal to noise ratio (SNR) generally decreases as device speeds increase, which conflicts with maintaining a high dynamic range. It is desirable to extend the bandwidth (or temporal resolution) and dynamic range of existing DAC devices.

SUMMARY

In optical systems, signal bandwidth is routinely increased using various optical modulators and nonlinear optical elements. Many of these optical bandwidth enhancement mechanisms do not have practical analogues in the electrical domain. The present technology provides cascaded and series configurations that utilize the nonlinearities of Mach-Zehnder electrooptic modulators to increase the device bandwidth and boost the fidelity of small signals in electronic DACs.

BRIEF DESCRIPTION OF THE DRAWINGS

The accompanying drawings, which are incorporated into and form a part of the disclosure, illustrate embodiments of the technology and, together with the description, serve to explain the principles of the technology.

DETAILED DESCRIPTION OF THE TECHNOLOGY

Mach-Zehnder modulators (MZMs) are electrooptical interferometers. The interferometer optical path delay is adjustable by imposing an electric field on one arm that modifies the optical refractive index in that arm. For an MZM biased to null (0 degrees), the normalized optical intensity output of an MZM relative to its electronic input is $$I_{out} = \sin^2\left(\frac{\pi V_{in}}{2 V_\pi}\right) \tag{1}$$

where $V_{in}$ is the input voltage and $V_\pi$ is input voltage required to achieve a phase delay of ½ wave. In commercially available 1550 nm MZMs, ~4V is enough to induce a ½ wave delay, and >50 GHz bandwidths are supported.

In telecommunications, digital signals are routinely converted between electrical and optical domains using MZMs and photodiode detectors (PDs), commonly described as electrical-optical-electrical (EOE) conversion. PDs are commercially available that have >50 GHz of bandwidth and 1V of linear dynamic range. Converting from the optical domain to the electrical domain with a PD is generally a linear process, since the PD's voltage output is linearly related to the optical intensity input within the linear dynamic range of the PD. Converting from the electronic domain to the optical domain with a MZM is generally a nonlinear process, due to the $\sin^2$ intensity output of the MZM relative to the voltage input (equation 1).

Figure 1:
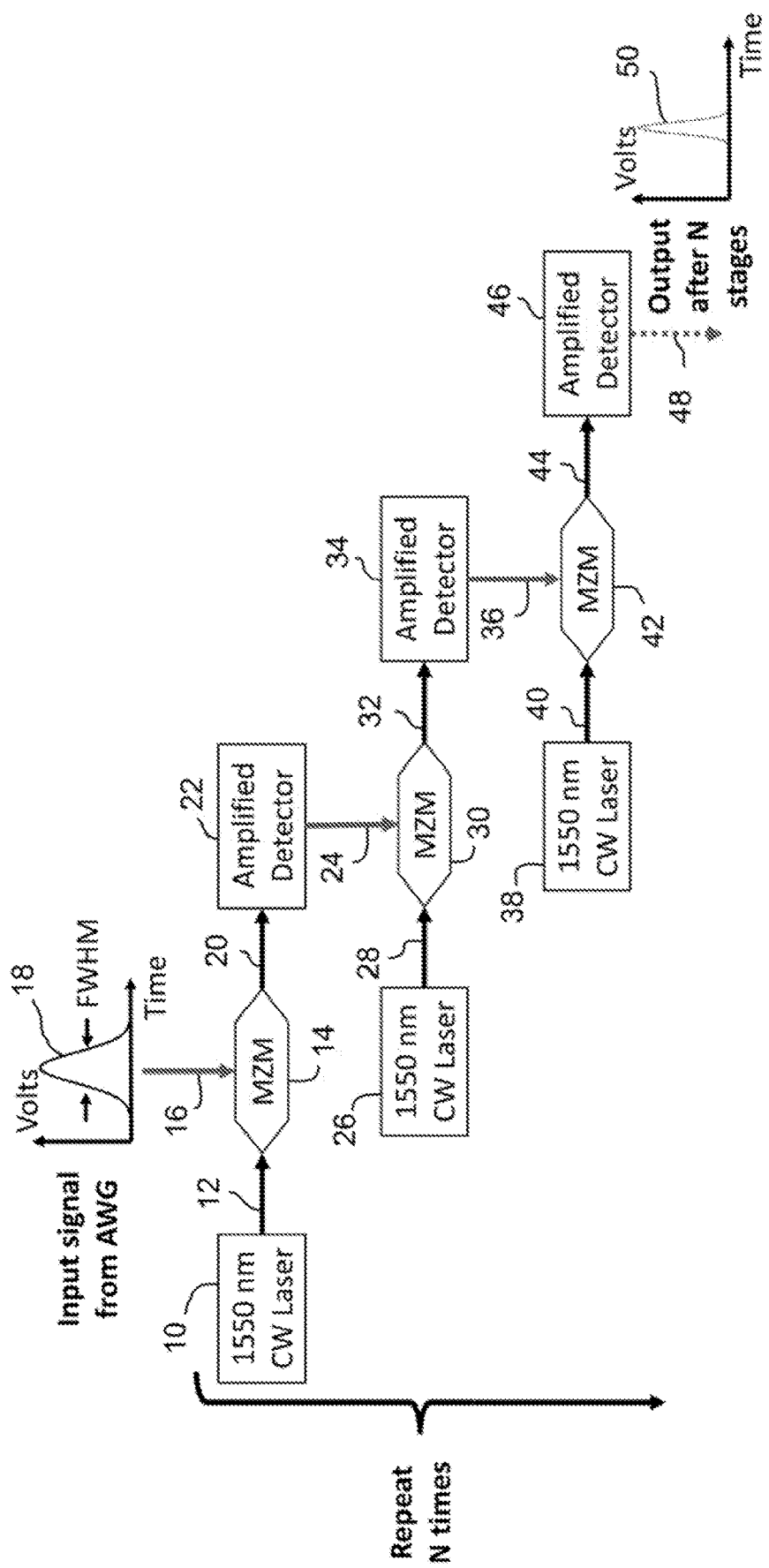
FIG. 1 illustrates an embodiment having cascading electrical to optical to electrical stages to compound enhancement.

For small signals, the nonlinear relationship between MZM input and output can be paraxially approximated as generating an optical intensity that is proportional to the square of the voltage input. This nonlinear gain between input and output shortens rise and fall times within the signal, sharpens the signal resolution, and increases the signal bandwidth. This nonlinearity is therefore a mechanism for enhancing DACs' native bandwidth and resolution. Daisy chaining multiple EOE stages as shown in FIG. 1 can compound this enhancement. Thus, FIG. 1 shows a cascaded embodiment of the present technology for shortening the rise and fall times within the signal, sharpening the signal resolution and increasing the signal bandwidth. Each stage consists of a laser to provide a laser beam, a Mach-Zehnder modulator (MZM) and a PD. Each PD can be an amplified detector with voltage gain, or an unamplified detector. In the latter case, optical input power to the PD should be sufficient to achieve the requisite output voltage level. In each stage, an electric field is imposed on one arm of MZM to modify the optical refractive index in that arm. More specifically, as shown in the figure, a continuous wave laser 10 is configured to provide a beam 12 at a wavelength of 1550 nm which is directed into a Mach-Zehnder modulator (MZM) 14. An input voltage 16 having a waveform, e.g., the Gaussian waveform 18, is applied to one arm of MZM 14. In this embodiment, the input voltage is provided by an arbitrary waveform generator, although other appropriate waveform sources are useable. The plot of Gaussian shaped pulse 18 shows the pulse full width at half maximum (FWHM). The output optical signal 20 from MZM 14 is directed into PD 22 which produces an output voltage 24 for input into the MZM of the next stage. As in the first stage, a 1550 nm CW laser 26 providing a beam 28 that is directed into MZM 30. Note that although this figure shows a different CW laser for each stage, some embodiments can use a single CW laser to provide a beam for input into all MZMs. Output optical signal 20 is applied on one arm of MZM 30 to modify the optical refractive index in that arm. The output beam 32 from MZM 30 is directed into PD 34 which produces an output voltage 36 to be applied to one arm of the MZM of the next stage. The final stage shown in this figure includes a CW laser 38 providing a laser beam 40 input into MZM 42. Output voltage 36 is applied to one arm of MZM 42. The optical signal output 44 from MZM 42 is directed into PD 46 which produces an output voltage signal 48 having waveform 50. Compared to waveform 18, waveform 50 has a shortened rise and fall times within the signal, a sharpened the signal resolution and an increased signal bandwidth. In fact, the amplified output of each stage has improved relative to its immediately preceding stage. The number of stages can be repeated as necessary to achieve an optimum output voltage.

Generating a user defined arbitrary waveform through cascaded stages requires solving equation 1 for $V_{in}$:

$$V_{in} = \frac{2V_\pi}{\pi} \sin^{-1}\left(\sqrt{V_{out}/A_{PD}}\right) \quad (2)$$

where $$V_{out} = I_{out} A_{PD} \quad (3)$$

and $A_{PD}$ is the amplified PD sensitivity in volts. For daisy chained EOE stages, equation 2 can be recursively solved for each EOE stage, starting with the last EOE stage as the first iteration and ending with the first EOE stage as the final iteration. After $V_{in}$ is solved for the full cascaded set of stages, this waveform can be deconvolved with the DAC's impulse response function. This solution will often generate an accurate initial guess, though an iterative procedure will generally be required to robustly converge to the desired waveform with high accuracy. There are a large variety of nonlinear optimizer algorithms available that will perform this task.

Figure 2:
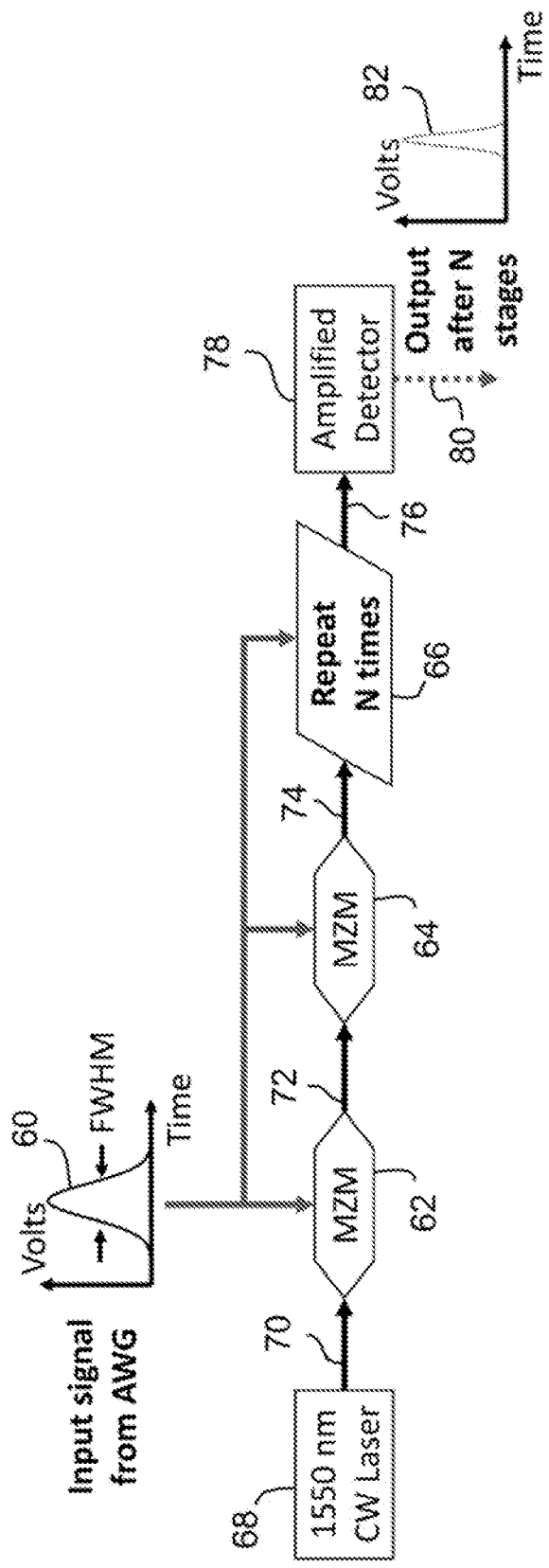
FIG. 2 illustrates an embodiment having series MZM stages to compound enhancement.

As an alternative to cascading stages, placing stages in series, e.g., as shown in FIG. 2, will result in similar benefits. A Gaussian waveform 60 from an AWG is sent to one arm of each MZM 62, 64, and alternately, an additional number of MZMs 66. In operation, a CW laser 68 provides a laser beam 70 having a wavelength of 1550 nm. Beam 70 is directed into MZM 62 which produces an output optical signal 72 which is directed into MZM 64, which produces an output optical signal 74, which is directed into the first MZM of MZMs 66. The final MZM of MZMs 66 produces an output optical signal 76 that is directed into a single PD 78 that produces an output voltage 80 having a waveform 82 that, compared to waveform 60, has a shortened rise and fall times within the signal, a sharpened the signal resolution and an increased signal bandwidth. The voltage observed on the final PD after N stages is predicted by:

$$V_{out} = A_{PD}^N \sin^{2N}\left(\frac{\pi V_{in}}{2V_\pi}\right) \quad (4)$$

In equation 4, $A_{PD}$ is the same for all N stages. Generating a user defined arbitrary waveform through series stages requires solving equation 4 for $V_{in}$:

$$V_{in} = \frac{2V_\pi}{\pi} \sin^{-1}\left(\sqrt[2N]{V_{out}/A_{PD}^N}\right) \quad (5)$$

where $V_{out}$ is defined in equation 3, and $V_{in}$ can be deconvolved with the DAC's impulse response function. This solution will often generate an accurate initial guess, though an iterative procedure will generally be required to robustly converge to the desired waveform with high accuracy.

Theoretical Performance for Temporal Resolution Enhancement

Figure 3A:
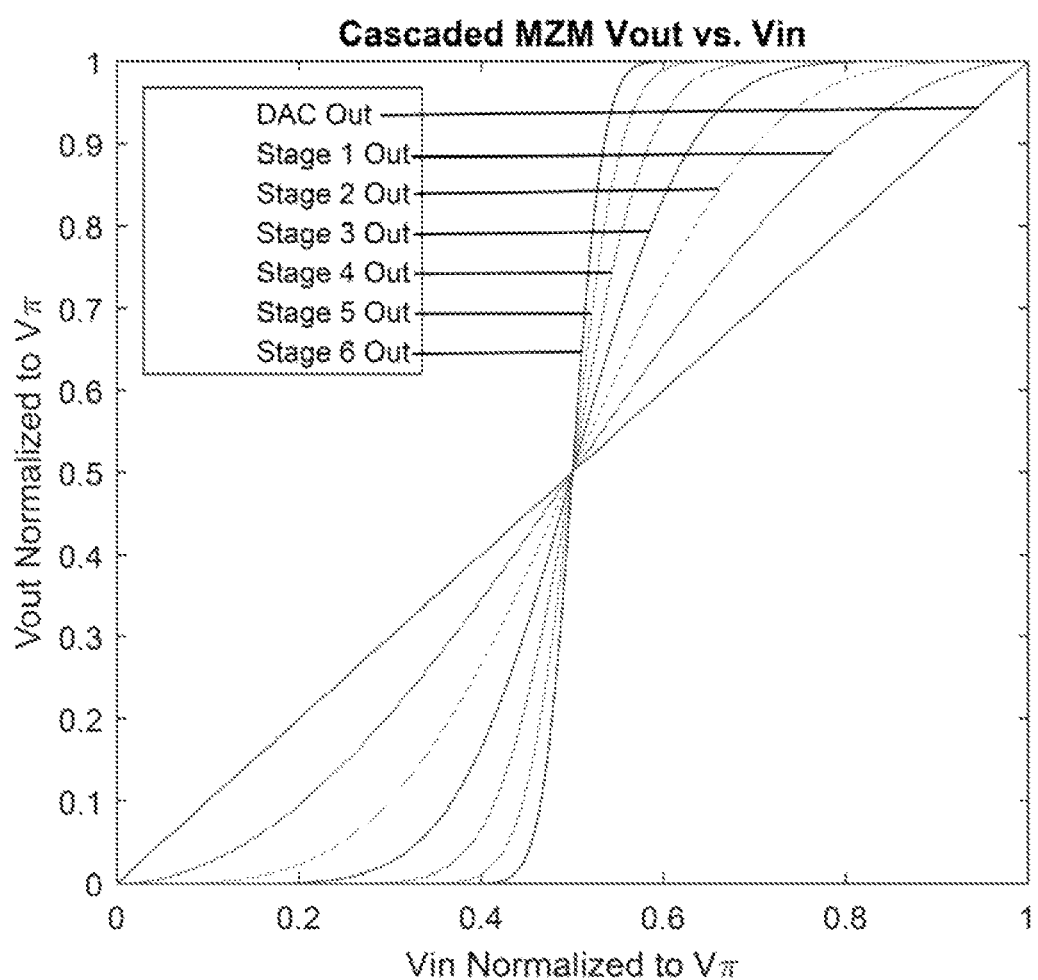
FIG. 3A shows the transmission curve (calibration curve) of N cascaded stages from 0V to $V_\pi$.
Figure 3B:
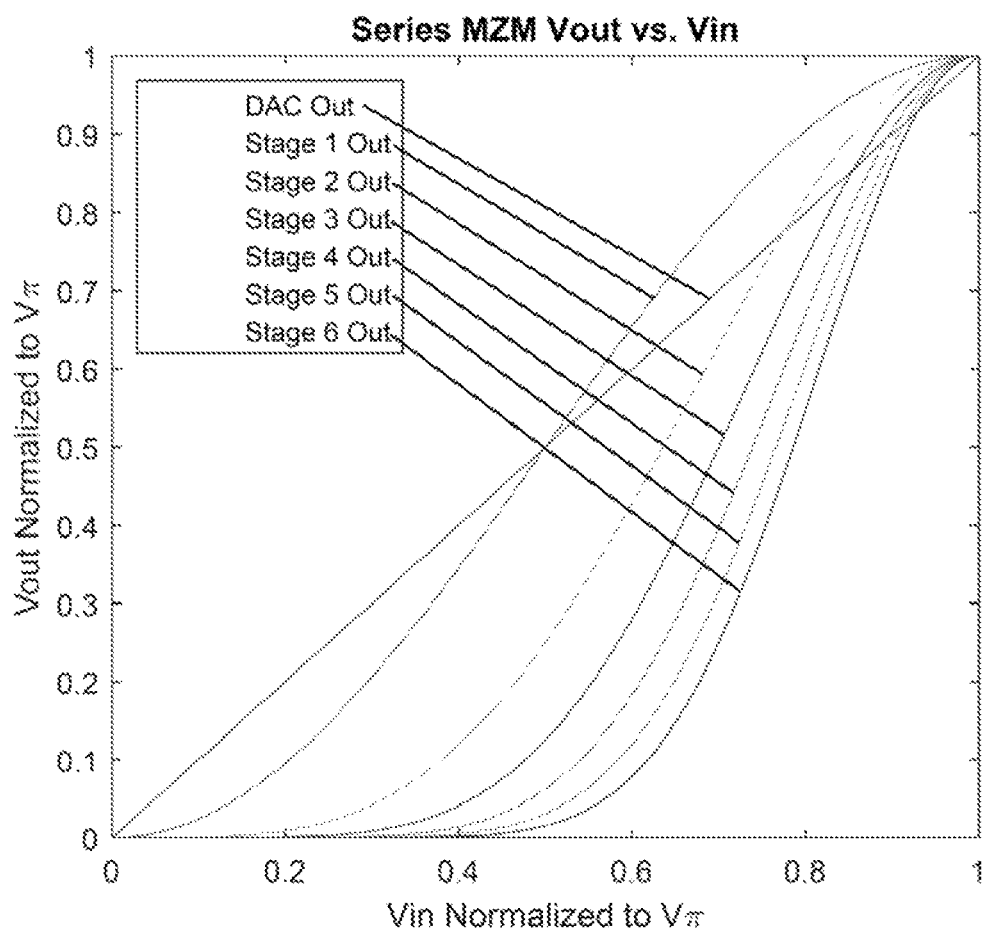
FIG. 3B shows the transmission curve (calibration curve) of N series stages from 0V to $V_\pi$.

In the small signal limit ($V_{in} < V_\pi/6$), a single stage has a $V_{out}$ that is proportional to $V_{in}^2$. For N stages, $V_{out}$ is proportional to $V_{in}^{2N}$ for cascaded stages (FIG. 3A) and is proportional to $V_{in}^{2N}$ for series stages (FIG. 3B). The double exponentiation of the voltage transfer function for cascaded stages result in steeper sigmoidal curves compared to series stages.

Figure 4A:
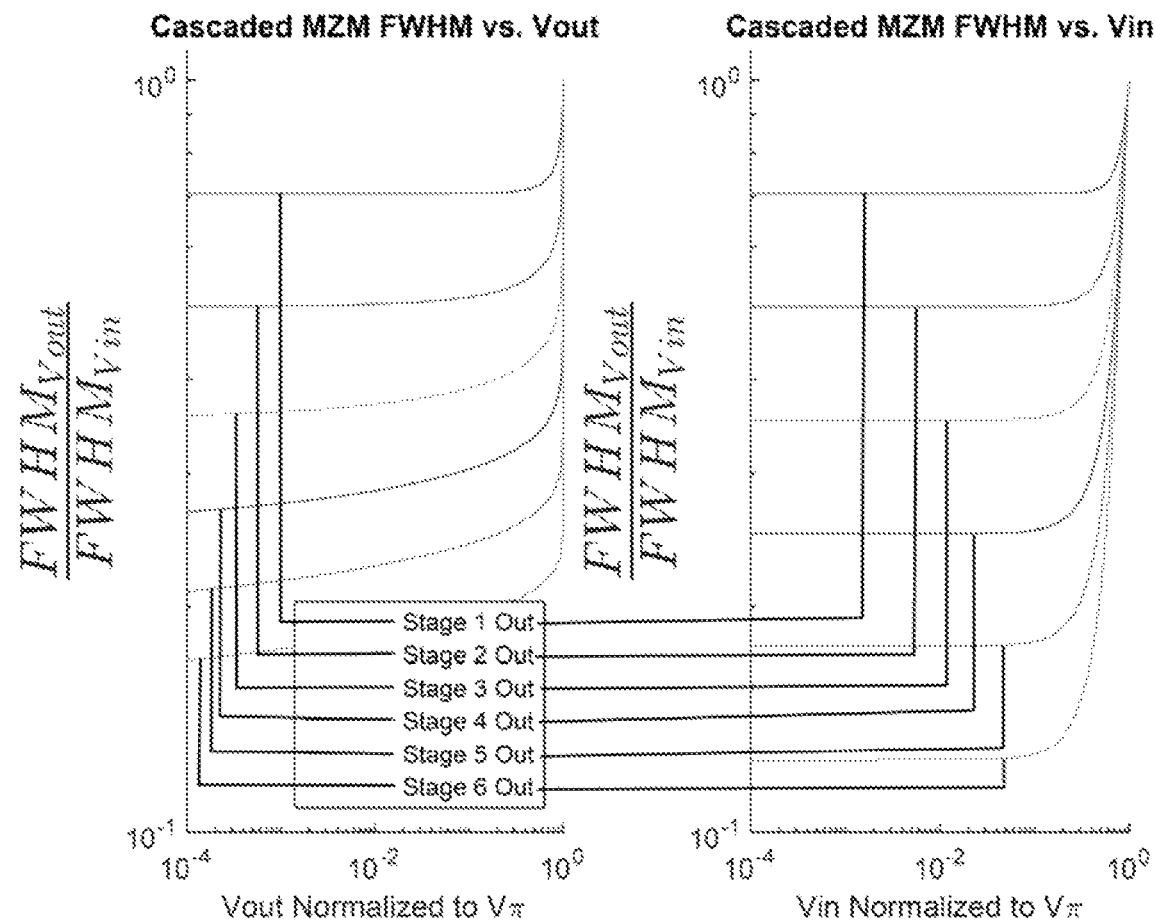
FIG. 4A shows the fractional change to the FWHM of a Gaussian pulse propagated in simulation through N cascaded MZM stages as a function of Gaussian peak amplitude $V_{in}$ (right graph) and as a function of peak amplitude $V_{out}$ (left graph).
Figure 4B:
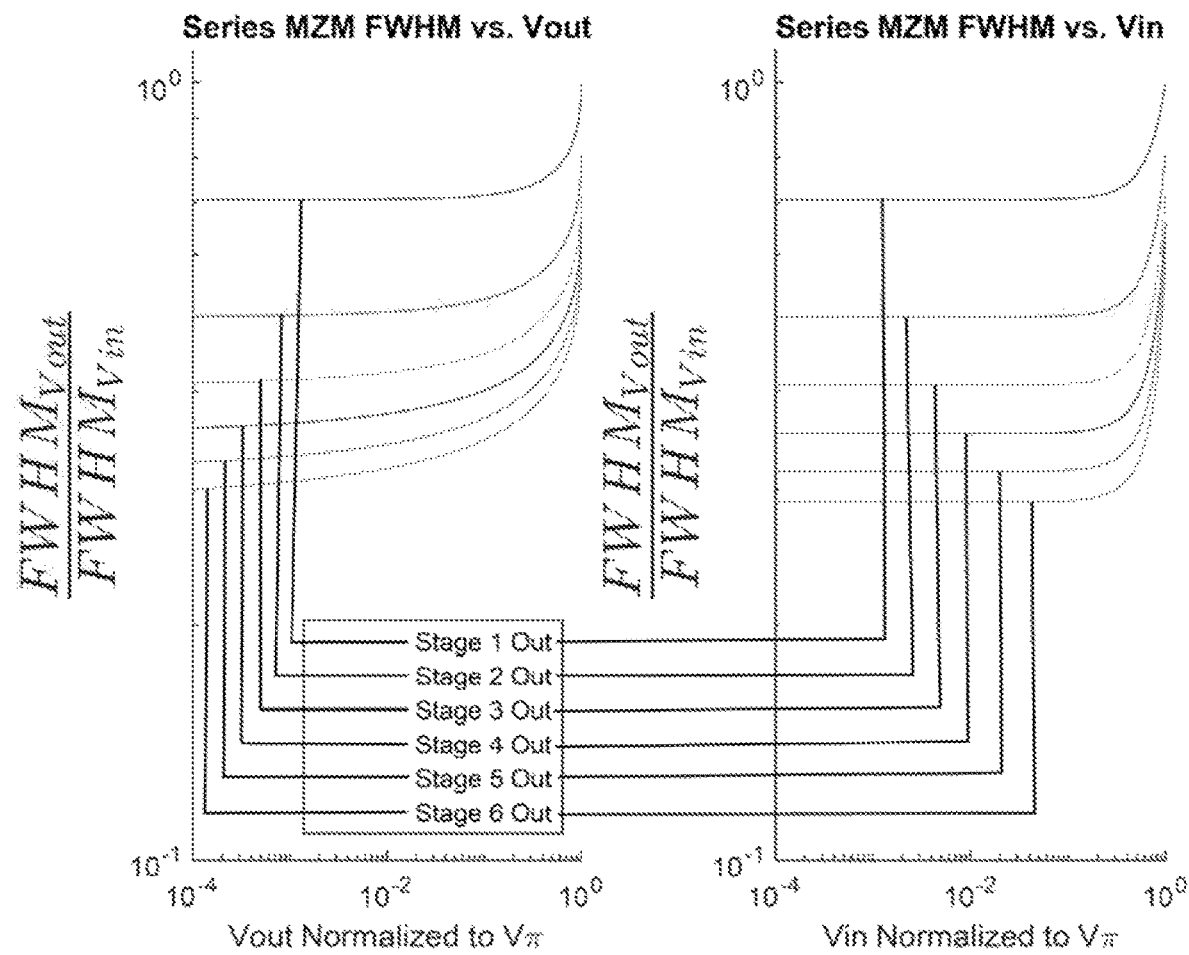
FIG. 4B shows the fractional change to the FWHM of a Gaussian pulse propagated in simulation through N series MZM stages as a function of Gaussian peak amplitude $V_{in}$ (right graph) and as a function of peak amplitude $V_{out}$ (left graph).

FIGS. 4A and 4B show the fractional change to the FWHM of a Gaussian propagated in simulation through N cascaded and series MZM stages, respectively. The right graphs in FIG. 4A and FIG. 4B show how the FWHM changes as a function of Gaussian peak amplitude $V_{in}$, and the left graphs show how the FWHM changes as a function of peak amplitude $V_{out}$. The system is configured in such as way as to ensure that $V_{in} = V_\pi$ gives an output of $V_{out} = V_{in} = V_\pi$. This relationship of $V_{in}$ to $V_{out}$ can be effected by adjusting the optical power level into each PD or, when using amplified detectors, by adjusting the gain of each PD.

All figures are normalized to $V_\pi$. The resulting $V_{out}$ FWHM is less than the $V_{in}$ FWHM for all Gaussian peak amplitudes less than $V_\pi$, and they reach equality at $V_\pi$. In the small signal limit, the factor of FWHM decrease is calculated as the square root of the exponential of the voltage response function, resulting in a FWHM decrease by a factor of $$\sqrt[2^N]{(\log_{V_{in}} V_{in}^{2^N})} = \sqrt[2^N]{2^N} = 2^{N/2}$$

for N stages in cascade or a factor of $$\sqrt[2N]{(\log_{V_{in}} V_{in}^{2N})} = \sqrt[2N]{2N}$$

for N stages in series. Therefore, N cascaded stages enhance temporal resolution more than N series stages. However, the dynamic range of $V_{out}$ does not practically exceed the noise floor limit, so the decrease in FWHM may not be fully realized to the predicted limit for large N.

Figure 5A:
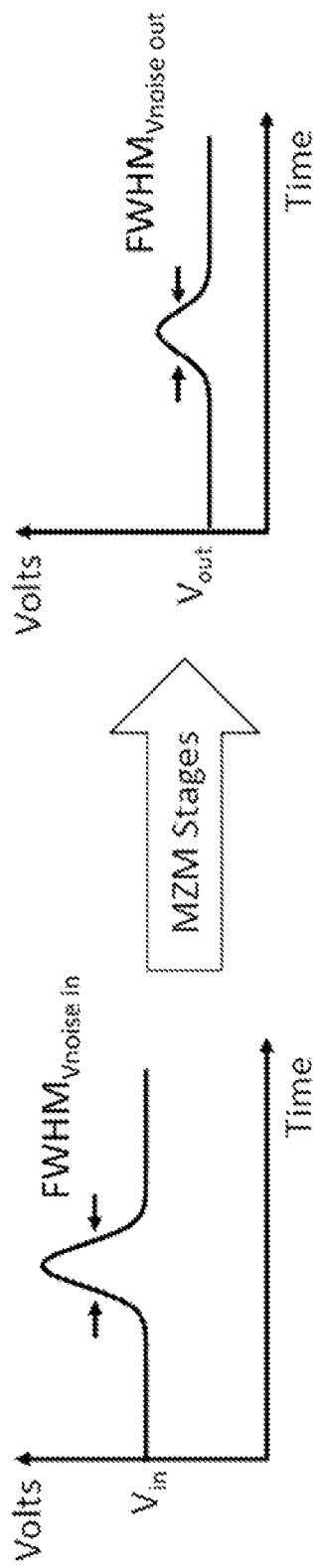
FIG. 5A shows an example of how a noise pulse on top of a $V_{in}$ signal propagates through MZM. For $V_{in} \gg V_{noise}$, the FWHM of $V_{noise}$ does not change, resulting in the noise bandwidth generally not getting enhanced.
Figure 5B:
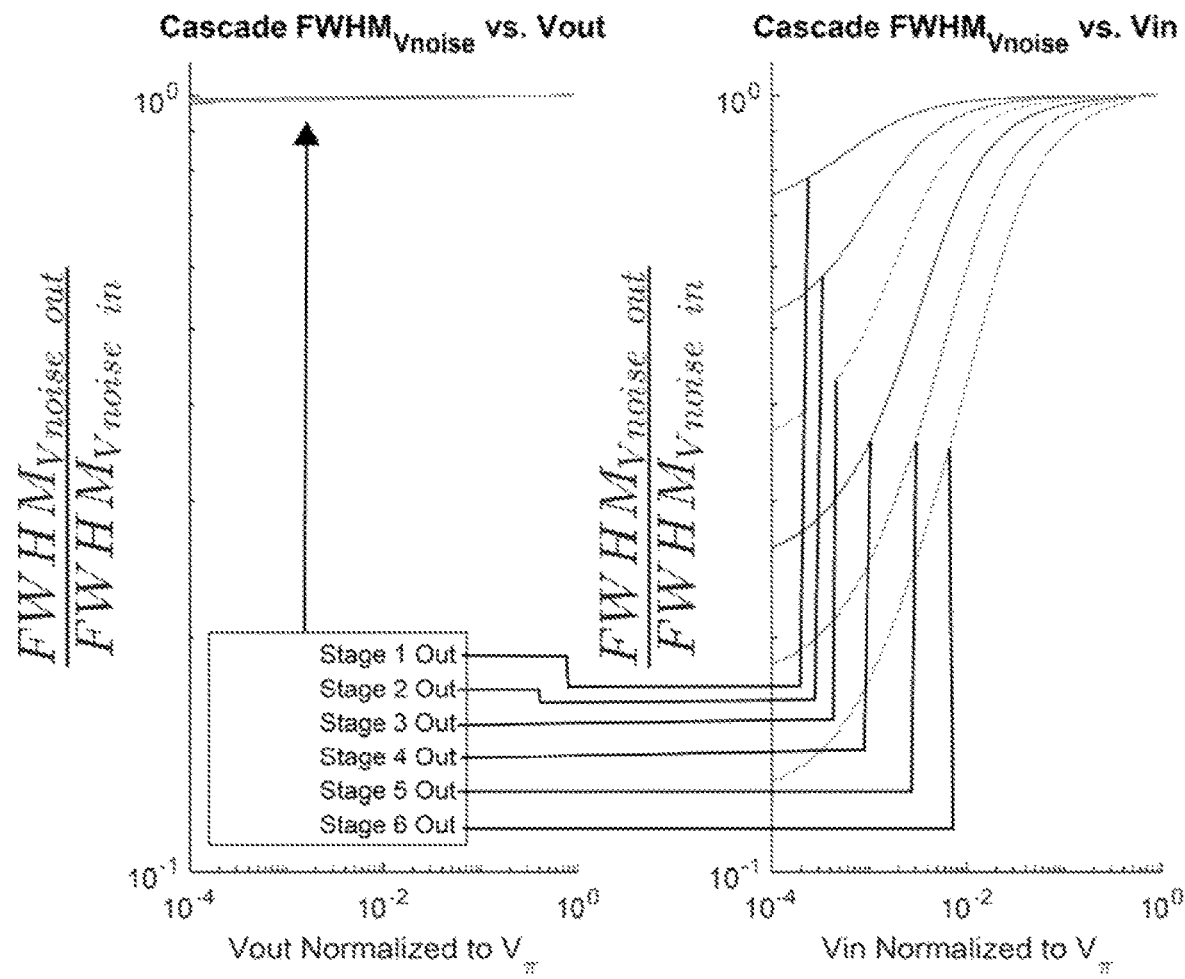
FIG. 5B shows the fractional change to the FWHM of a $V_\pi/1000$ Gaussian noise pulse on top of signal voltage level $V_{in}$ propagated in simulation through N cascaded MZM stages as a function of Gaussian peak amplitude $V_{in}$ (right graph) and as a function of peak amplitude $V_{out}$ (left graph). For the majority of the $V_{out}$ dynamic range of the N-stage device, the noise FWHM is not significantly enhanced.
Figure 5C:
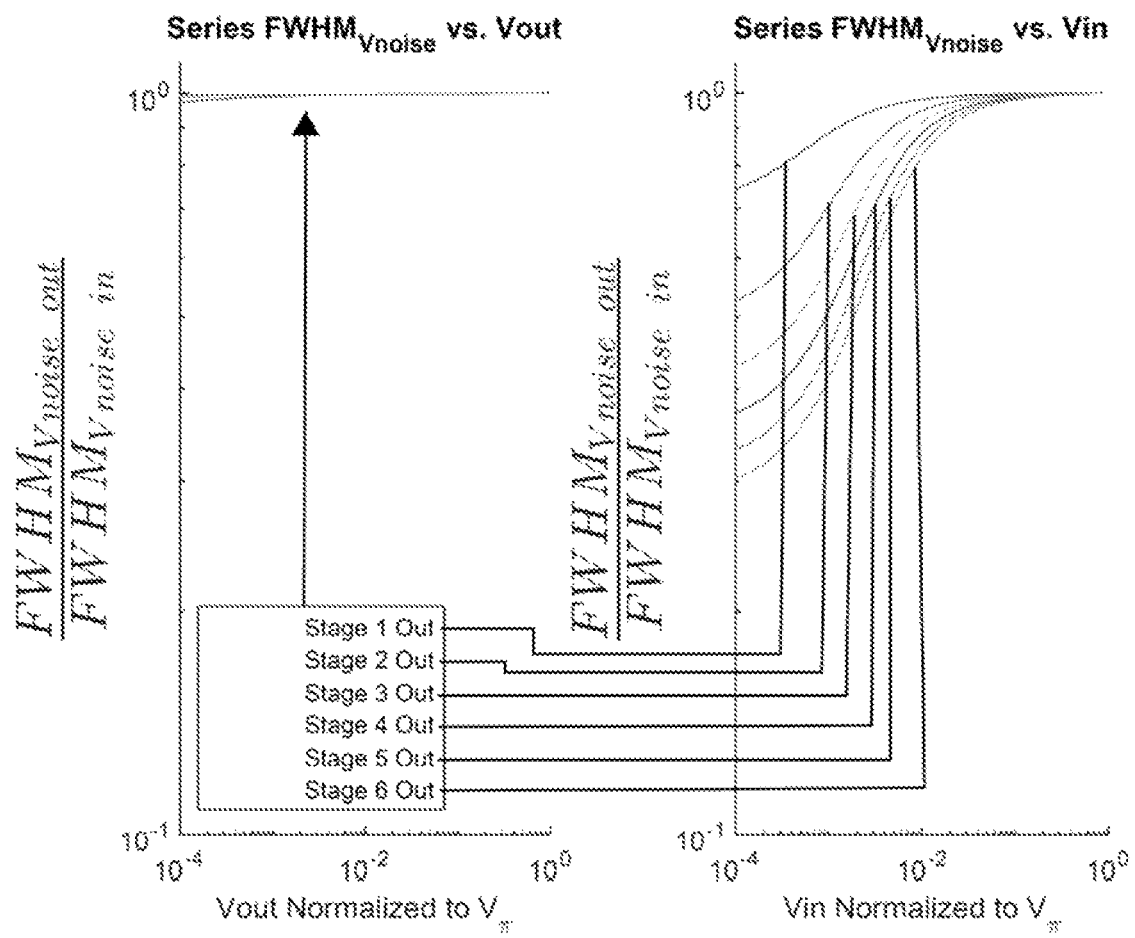
FIG. 5C shows the fractional change to the FWHM of a $V_\pi/1000$ Gaussian noise pulse on top of signal voltage level $V_{in}$ propagated in simulation through N series MZM stages as a function of Gaussian peak amplitude $V_{in}$ (right graph) and as a function of peak amplitude $V_{out}$ (left graph). For the majority of the $V_{out}$ dynamic range of the N-stage device, the noise FWHM is not significantly enhanced.

The temporal resolution of noise features does not sharpen along with the input signal. For small noise on signals, $V_{out}$ is proportional to $(V_{in}+V_{noise})^{2^N}$ for cascaded stages or to $(V_{in}+V_{noise})^{2N}$ for series stages, and many cross terms result in both cases. For $V_{in} \gg V_{noise}$, nonlinear components of $V_{noise}$ are small relative to linear $V_{noise}$ cross terms, resulting in a mostly linear propagation of $V_{noise}$ through these stages and minimal temporal sharpening of noise features (FIG. 5A). FIGS. 5B and 5C shows the fractional change to the FWHM of a $V_\pi/1000$ Gaussian noise pulse on top of voltage level $V_{in}$ propagated in simulation through N cascaded and series MZM stages, respectively. The right graphs in FIGS. 5B and 5C show how the FWHM of the noise pulse changes as a function of $V_{in}$, and the left graphs show how the FWHM changes as a function of $V_{out}$. The chosen noise amplitude of $V_\pi/1000$ is typical of commercial DAC noise amplitudes. For $V_{in}$ that is >10× the magnitude of $V_{noise}$, there was minimal decrease in noise temporal features.

Theoretical Performance for Dynamic Range Enhancement

Figure 6A:
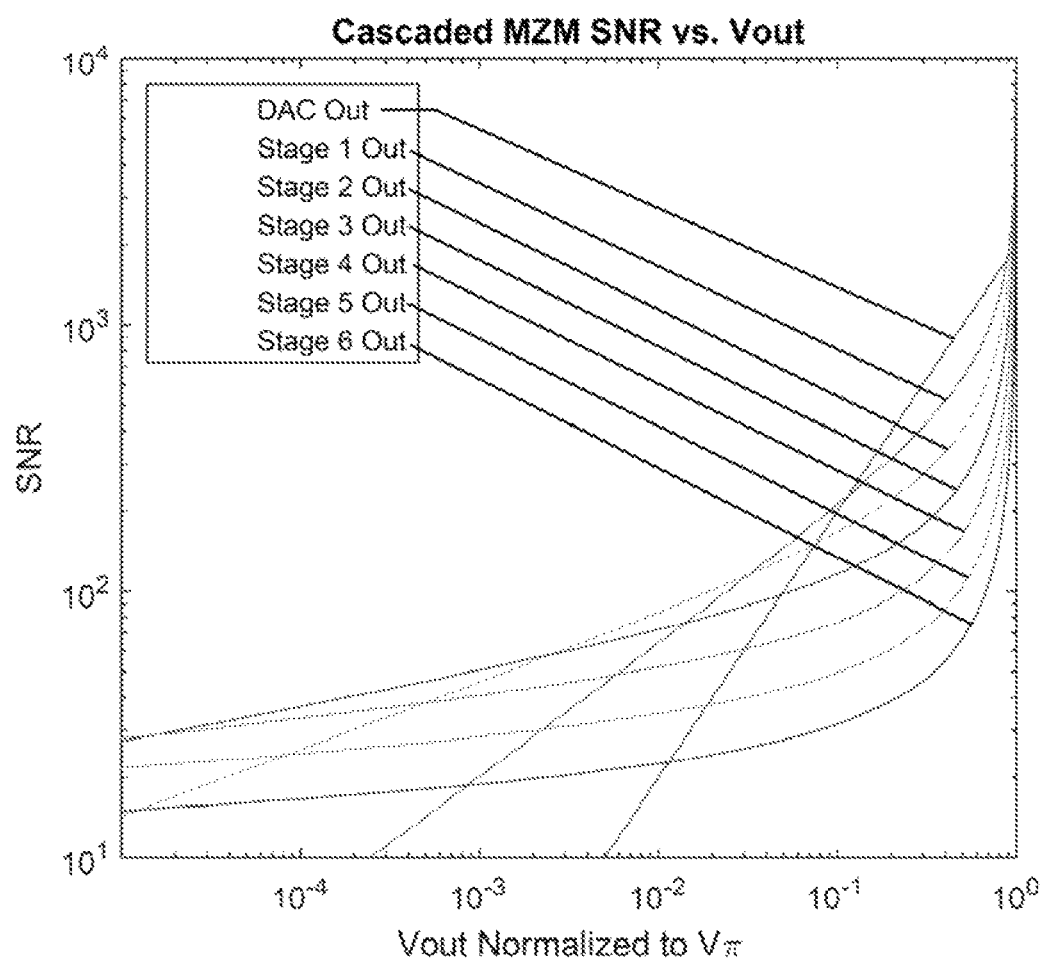
FIG. 6A shows the SNR calculated by Monte-Carlo simulation of N cascaded MZM stages as a function of $V_{out}$. The SNR for small and large signals is significantly enhanced at the tradeoff of lower SNR for mid-range signals. This increases the small signal dynamic range by several orders of magnitude as well as enables shaping of very small features on large signals.
Figure 6B:
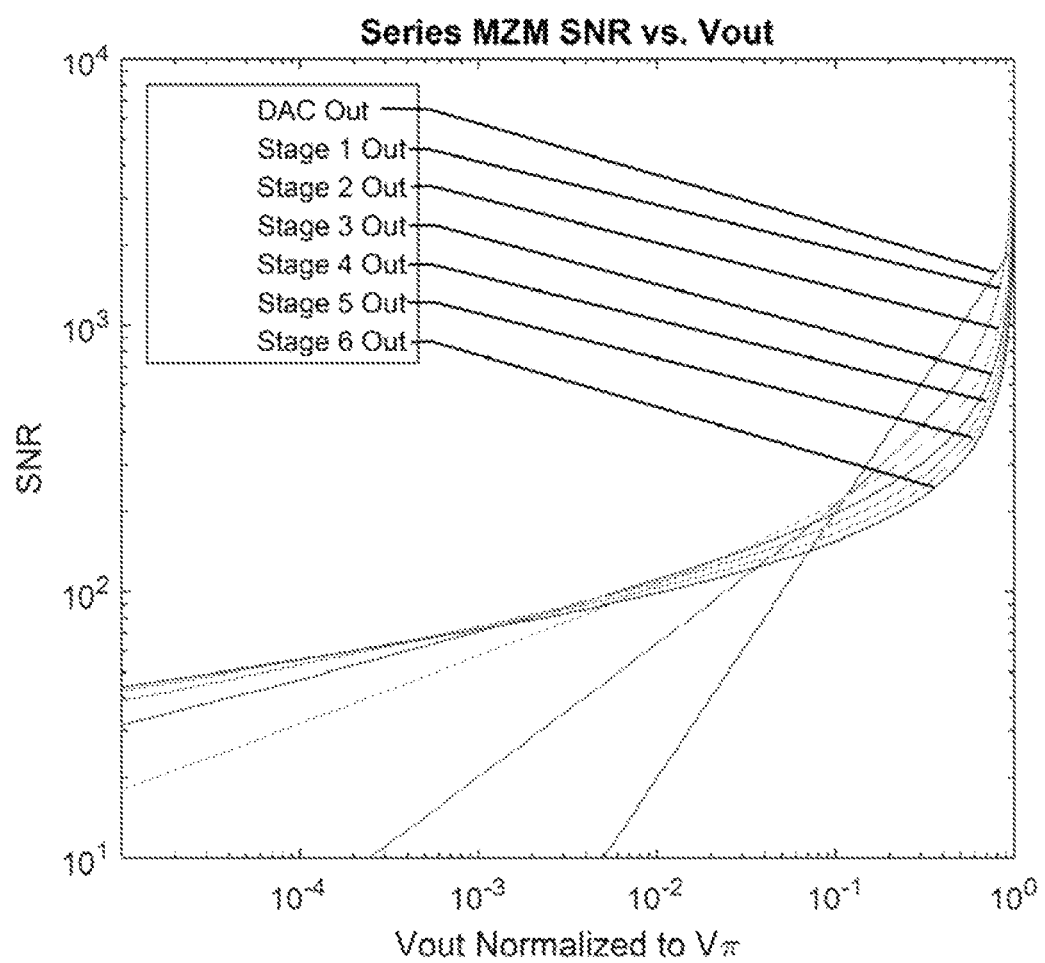
FIG. 6B shows the SNR calculated by Monte-Carlo simulation of N series MZM stages as a function of $V_{out}$. The SNR for small and large signals is significantly enhanced at the tradeoff of lower SNR for mid-range signals. This increases the small signal dynamic range by several orders of magnitude with less tradeoff of mid-range signal SNR compared to the cascaded embodiment, and still enables shaping of very small features on large signals.

Monte-Carlo simulations of a simple ramp voltage propagating through multiple MZM stages were performed to demonstrate the calibration curve and noise propagation through the system (FIGS. 6A and 6B, described below). The noise was modeled as being independent of the DAC output voltage, resulting in a DAC SNR that is proportional to the DAC $V_{out}$. After the going through a single MZM stage, small signals and signals near $V_\pi$ generally had decreased sensitivity (more horizontal calibration curve) compared to DAC $V_{out}$, and mid-range signals generally had increased sensitivity (more vertical calibration curve) compared to DAC $V_{out}$ (FIGS. 3A and 3B). The slope of the calibration curve has an inverse relationship with the SNR, resulting in a redistribution of SNR away from regions of high sensitivity and towards regions of low sensitivity (FIGS. 6A and 66). This results in large improvement in SNR for small signals, and enhances the useable small signal dynamic range of the DAC by several orders of magnitude. The SNR at $V_\pi$ is also greatly enhanced, which can be used for generating small signals with high fidelity on top of large signals. Series MZM arrangements have a relative advantage for small signal dynamic range enhancement (FIG. 6A), and cascade MZM arrangements balance the SNR redistribution equally to the small signal and large signal regimes (FIG. 6B).

In addition to smaller noise at regions of low sensitivity, these regions also have a finer vertical resolution. The uniformly spaced voltage bins of the DAC are transformed to non-uniform spacing according to the calibration curve. The compression of the noise in these low sensitivity regions matches the compression of the voltage bins, resulting in a variable vertical resolution that is always matched to its noise level.

The SNR for any output voltage predicted after a single stage is:

$$SNR_{V_{out}} = \frac{V_\pi}{\pi V_{in}} \tan\left(\frac{\pi V_{in}}{2V_\pi}\right) SNR_{V_{in}} \qquad (6)$$

For cascading stages, equation 6 can be recursively solved along with equation 2 for each stage, where $SNR_{V_{out}}$ becomes $SNR_{V_{in}}$ for the next stage, and $V_{out}$ in equation 2 becomes $V_{in}$ for the next stage in equations 2 and 6.

For stages in series, the SNR for any output voltage predicted by equation 4 after N series stages is:

$$SNR_{V_{out}} = \frac{1}{N\pi} \frac{V_\pi}{V_{in}} \tan\left(\frac{\pi V_{in}}{2V_\pi}\right) SNR_{V_{in}} \qquad (7)$$

Despite that equation 7 apparently reduces the SNR for any input voltage $V_{in}$ by a factor of N, the voltage after N stages is also transformed through equation 4. Plotting the SNR vs. the generated output voltage results in the SNR curves identical to those shown in FIG. 6.

The DAC output for the SNR simulation of FIGS. 6A and 6B was formatted to span the full $V_\pi$ range of the modulator(s). However, spanning a fraction of that range with the further boosts the dynamic range enhancement at the tradeoff of optical efficiency. This is particularly advantageous if shaping of small features on large signals is not desired. Spanning only the range of 0V~$V_\pi/6$ (the paraxial range) with the series configuration maximizes the dynamic range enhancement, though at significant tradeoff of optical efficiency. Spanning $V_{in}$ to ~80% of $V_\pi$ with the series configuration is a fortuitous compromise tradeoff point where ~90% optical efficiency is achieved per stage for a gain of ~27% increased SNR for small signals.

Broadly, this writing discloses at least the following.

The nonlinearities of cascaded and series configurations of Mach-Zehnder electrooptic modulators are utilized to increase signal bandwidth and boost signal fidelity in electronic digital to analog converters.

This writing also presents at least the following Concepts.

Concepts:

1. An apparatus, comprising:

Mach-Zehnder modulators (MZMs) numbered MZM #1 to MZM #n;

means for applying a first voltage waveform to a first optical arm of said MZM #1;

a laser source for producing laser light and configured to direct said laser light into the two arms of at least said MZM #1 to produce a first output optical signal; and means utilizing said first output optical signal and MZMs numbered MZM #2 to said MZM #n to produce a final output voltage waveform, wherein, compared to said input voltage, said output voltage waveform comprises at least one of (i) a shorter rise time, (ii) a shorter fall time, (iii) increased signal temporal resolution, (iv) increased small signal dynamic range, (v) increased vertical resolution for small signals, (vi) increased vertical resolution for large signals, (vii) reduced noise on small signals, (viii) reduced noise on large signals and (ix) increased bandwidth.

2. The apparatus of concepts 1 and 4, wherein said MZMs are configured in a cascaded configuration wherein said first voltage waveform is only applied to said first arm of said MZM #1 and wherein first output optical signal is detected and amplified by a first amplified detector to produce a first amplified voltage waveform that is applied to an optical arm of said MZM #2.

3. The apparatus of concepts 1 and 4, wherein said MZMs are configured in a series configuration wherein said first voltage waveform is applied to an optical arm of all said MZMs.

4. The apparatus of concepts 1-3, wherein each said MZM is biased at the null.

5. An apparatus, comprising:
a first stage including:
means for providing first laser light;
a first Mach-Zehnder modulator (MZM) comprising a first optical arm and a second optical arm, wherein said first MZM is configured to receive at least a first portion of said first laser light into said first optical arm and at least a second portion of said first laser light into said second optical arm;
means for applying an input voltage waveform to one of said first optical arm or said second optical arm, wherein said first portion of said first laser light and said second portion of said first laser light propagate through said first MZM and interfere one with the other to produce a first output optical signal; and
a first amplified detector configured to detect said first output optical signal and produce a first output voltage waveform; and
a second stage comprising:
means for providing second laser light;
a second MZM comprising a third optical arm and a fourth optical arm, wherein said second MZM is configured to receive at least a first portion of said second laser light into said third optical arm and at least a second portion of said second laser light into said fourth optical arm;
means for applying said first output voltage waveform to one of said third optical arm or said fourth optical arm, wherein said first portion of said second laser light and said second portion of said second laser light propagate through said second MZM and interfere one with the other to produce a second output optical signal; and
a second amplified detector configured to detect said second output optical signal and produce a second output voltage waveform.

6. The apparatus of concepts 5, 7 and 8, wherein said second output voltage waveform, compared to said input voltage waveform, has an enhancement selected from the group consisting of (i) a shorter rise time, (ii) a shorter fall time, (iii) increased signal temporal resolution, (iv) increased small signal dynamic range, (v) increased vertical resolution for small signals, (vi) increased vertical resolution for large signals, (vii) reduced noise on small signals, (viii) reduced noise on large signals and (ix) increased bandwidth.

7. The apparatus of concepts 5, 6 and 8, wherein said means for providing first laser light and said means for providing second laser light are a single laser that provides both said first laser light and said second laser light.

8. The apparatus of concepts 5-7, wherein said first MZM and said second MZM are biased at the null.

9. An apparatus, comprising:
means for providing an input voltage waveform;
means for providing laser light;
a series of Mach-Zehnder modulators (MZMs), wherein each MZM of said series comprises two optical arms;
means for applying said input voltage waveform to one arm of said each MZM, wherein a first MZM of said series of said MZMs is configured to receive said laser light into its two optical arms and produce an output optical signal that is directed into the two arms of a second MZM of said series of MZMs, wherein said each MZM of said plurality of MZMs is configured to receive the respective output optical signal produced by its immediately preceding MZM, wherein the last MZM of said series produces a final output optical signal; and
an amplified detector configured to receive said final output optical signal to produce an output voltage waveform.

10. The apparatus of concepts 9 and 11, wherein said output voltage waveform, compared to said input voltage waveform, has an enhancement selected from the group consisting of (i) a shorter rise time, (ii) a shorter fall time, (iii) increased signal temporal resolution, (iv) increased small signal dynamic range, (v) increased vertical resolution for small signals, (vi) increased vertical resolution for large signals, (vii) reduced noise on small signals, (viii) reduced noise on large signals and (ix) increased bandwidth.

11. The apparatus of concepts 9 and 10, wherein each said MZM of said series of MZMs is biased at the null.

12. A method, comprising:
providing Mach-Zehnder modulators (MZMs) numbered MZM #1 to MZM #n;
applying a first voltage waveform to a first optical arm of said MZM #1;
directing laser light into the two arms of at least said MZM #1 to produce a first output optical signal; and
utilizing said first output optical signal and MZMs numbered MZM #2 to said MZM #n to produce a final output voltage waveform, wherein, compared to said input voltage, said output voltage waveform comprises at least one of (i) a shorter rise time, (ii) a shorter fall time, (iii) increased signal temporal resolution, (iv) increased small signal dynamic range, (v) increased vertical resolution for small signals, (vi) increased vertical resolution for large signals, (vii) reduced noise on small signals, (viii) reduced noise on large signals and (ix) increased bandwidth.

13. The method of concepts 12 and 15, wherein said MZMs are configured in a cascaded configuration wherein said first voltage waveform is only applied to said first arm of said MZM #1 and wherein first output optical signal is detected and amplified by a first amplified detector to produce a first amplified voltage waveform that is applied to an optical arm of said MZM #2.

14. The method of concepts 12 and 15, wherein said MZMs are configured in a series configuration, the method comprising applying said first voltage waveform to an optical arm of all said MZMs.

15. The method of concepts 12-14, further comprising biasing each said MZM biased at the null.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus, comprising:
Mach-Zehnder modulators (MZMs) numbered MZM #1 to MZM #n;
a waveform source for applying a first voltage waveform to a first optical arm of said MZM #1;
a laser source for producing laser light and configured to direct said laser light into the two arms of at least said MZM #1 to produce a first output optical signal;
means utilizing said first output optical signal and MZMs numbered MZM #2 to said MZM #n to produce a final output voltage waveform, wherein:
said means utilizing said first output optical signal and MZMs numbered MZM #2 to said MZM #n comprise said MZMs numbered MZM #2 to said MZM #n configured in a cascaded configuration with MZM #1, wherein said first voltage waveform is only applied to said first arm of said MZM #1 and wherein said first output optical signal is detected and amplified by a first amplified detector to produce a first amplified voltage waveform that is applied to an optical arm of said MZM #2; or wherein
said means utilizing said first output optical signal and MZMs numbered MZM #2 to said MZM #n comprise said MZMs numbered MZM #2 to said MZM #n configured in a series configuration with MZM #1, wherein said first voltage waveform is applied to an optical arm of all said MZMs; and
wherein, compared to said input voltage, said output voltage waveform comprises at least one of
(i) a shorter rise time,
(ii) a shorter fall time,
(iii) increased signal temporal resolution,
(iv) increased small signal dynamic range,
(v) increased vertical resolution for small signals,
(vi) increased vertical resolution for large signals,
(vii) reduced noise on small signals,
(viii) reduced noise on large signals and
(ix) increased bandwidth.

2. The apparatus of claim 1, wherein each said MZM is biased at the null.

3. An apparatus, comprising: a first stage including:
a first laser light source for providing first laser light;
a first Mach-Zehnder modulator (MZM) comprising a first optical arm and a second optical arm, wherein said first MZM is configured to receive at least a first portion of said first laser light into said first optical arm and at least a second portion of said first laser light into said second optical arm;
a waveform source for applying an input voltage waveform to one of said first optical arm or said second optical arm, wherein said first portion of said first laser light and said second portion of said first laser light propagate through said first MZM and interfere one with the other to produce a first output optical signal; and
a first amplified detector configured to detect said first output optical signal and produce a first output voltage waveform; and
a second stage comprising:
a second laser light source for providing second laser light;
a second MZM comprising a third optical arm and a fourth optical arm, wherein said second MZM is configured to receive at least a first portion of said second laser light into said third optical arm and at least a second portion of said second laser light into said fourth optical arm;
said first amplified detector being configured for applying said first output voltage waveform to one of said third optical arm or said fourth optical arm, wherein said first portion of said second laser light and said second portion of said second laser light propagate through said second MZM and interfere one with the other to produce a second output optical signal; and
a second amplified detector configured to detect said second output optical signal and produce a second output voltage waveform.

4. The apparatus of claim 3, wherein said second output voltage waveform, compared to said input voltage waveform, has an enhancement selected from the group consisting of
(i) a shorter rise time,
(ii) a shorter fall time,
(iii) increased signal temporal resolution,
(iv) increased small signal dynamic range,
(v) increased vertical resolution for small signals,
(vi) increased vertical resolution for large signals, (vii) reduced noise on small signals, (viii) reduced noise on large signals and (ix) increased bandwidth.

5. The apparatus of claim 3, wherein said first source of laser light and said second source of laser light are a single laser that provides both said first laser light and said second laser light.

6. The apparatus of claim 3, wherein said first MZM and said second MZM are biased at the null.

7. An apparatus, comprising:
a waveform source for providing an input voltage waveform;
a source of laser light for providing laser light;
a series of Mach-Zehnder modulators (MZMs), wherein each MZM of said series comprises two optical arms;
the waveform source being configured for applying said input voltage waveform to one arm of said each MZM, wherein a first MZM of said series of said MZMs is configured to receive said laser light into its two optical arms and produce an output optical signal that is directed into the two arms of a second MZM of said series of MZMs, wherein said each MZM of said plurality of MZMs is configured to receive the respective output optical signal produced by its immediately preceding MZM, wherein the last MZM of said series produces a final output optical signal; and
an amplified detector configured to receive said final output optical signal to produce an output voltage waveform.

8. The apparatus of claim 7, wherein said output voltage waveform, compared to said input voltage waveform, has an enhancement selected from the group consisting of
(i) a shorter rise time,
(ii) a shorter fall time,
(iii) increased signal temporal resolution,
(iv) increased small signal dynamic range, (v) increased vertical resolution for small signals,
(vi) increased vertical resolution for large signals,
(vii) reduced noise on small signals,
(viii) reduced noise on large signals and
(ix) increased bandwidth.

9. The apparatus of claim 7, wherein each said MZM of said series of MZMs is biased at the null.

10. A method, comprising:
providing Mach-Zehnder modulators (MZMs) numbered MZM #1 to MZM #n;
applying a first voltage waveform to a first optical arm of said MZM #1;
directing laser light into the two arms of at least said MZM #1 to produce a first output optical signal; and
utilizing said first output optical signal and MZMs numbered MZM #2 to said MZM #n to produce a final output voltage waveform, wherein:
said utilizing said first output optical signal and MZMs numbered MZM #2 to said MZM #n comprise utilizing said MZMs numbered MZM #2 to said MZM #n configured in a cascaded configuration with MZM #1, wherein said first voltage waveform is only applied to said first arm of said MZM #1 and wherein said first output optical signal is detected and amplified by a first amplified detector to produce a first amplified voltage waveform that is applied to an optical arm of said MZM #2; or wherein
said utilizing said first output optical signal and MZMs numbered MZM #2 to said MZM #n comprise utilizing said MZMs numbered MZM #2 to said MZM #n configured in a series configuration with MZM #1, wherein said first voltage waveform is applied to an optical arm of all said MZMs; and
wherein, compared to said input voltage, said output voltage waveform comprises at least one of
(i) a shorter rise time,
(ii) a shorter fall time,
(iii) increased signal temporal resolution,
(iv) increased small signal dynamic range,
(v) increased vertical resolution for small signals,
(vi) increased vertical resolution for large signals,
(vii) reduced noise on small signals,
(viii) reduced noise on large signals and
(ix) increased bandwidth.

11. The method of claim 10, further comprising biasing each said MZM biased at the null.

* * * * *